(12) United States Patent
Yasuhara et al.

(10) Patent No.: US 8,418,408 B2
(45) Date of Patent: Apr. 16, 2013

(54) VEHICLE DOOR STRUCTURE AND METHOD FOR FABRICATING THE SAME

(75) Inventors: Shigeto Yasuhara, Saitama (JP); Shingo Segawa, Saitama (JP); Masatoshi Horino, Saitama (JP); Masami Kominamidate, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 208 days.

(21) Appl. No.: 12/936,404

(22) PCT Filed: Jan. 21, 2009

(86) PCT No.: PCT/JP2009/000208
§ 371 (c)(1),
(2), (4) Date: Oct. 5, 2010

(87) PCT Pub. No.: WO2009/125528
PCT Pub. Date: Oct. 15, 2009

(65) Prior Publication Data
US 2011/0023373 A1 Feb. 3, 2011

(30) Foreign Application Priority Data

Apr. 8, 2008 (JP) ................................. 2008-100489
Jul. 16, 2008 (JP) ................................. 2008-184875

(51) Int. Cl.
*B60J 5/04* (2006.01)
*E06B 3/34* (2006.01)

(52) U.S. Cl.
USPC ............................ 49/502; 49/501; 296/146.6

(58) Field of Classification Search ............... 49/501, 49/502; 296/146.5, 146.6, 187.12
See application file for complete search history.

(56) References Cited

U.S. PATENT DOCUMENTS

| | | | |
|---|---|---|---|
| 3,782,036 A * | 1/1974 | Clark et al. | 49/502 |
| 3,936,090 A | 2/1976 | Aya et al. | |
| 3,964,208 A * | 6/1976 | Renner et al. | 49/502 |
| 4,306,381 A * | 12/1981 | Presto | 49/502 |
| 4,328,642 A * | 5/1982 | Presto | 49/502 |
| 4,411,103 A * | 10/1983 | Ohmura et al. | 49/502 |
| 4,651,470 A * | 3/1987 | Imura et al. | 49/502 |
| 4,711,052 A * | 12/1987 | Maeda et al. | 49/502 |
| 4,850,636 A * | 7/1989 | McLaren et al. | 296/146.5 |
| 4,969,680 A * | 11/1990 | Shimoda | 296/146.6 |
| 5,039,160 A * | 8/1991 | Garnweidner et al. | 296/187.12 |
| 5,272,841 A * | 12/1993 | Freeman et al. | 49/502 |

(Continued)

FOREIGN PATENT DOCUMENTS

| | | |
|---|---|---|
| JP | 55-87812 U | 6/1980 |
| JP | 59-182424 U | 12/1984 |

(Continued)

*Primary Examiner* — Katherine Mitchell
*Assistant Examiner* — Justin Rephann
(74) *Attorney, Agent, or Firm* — Carrier Blackman & Associates, P.C.; William D. Blackman; Joseph P. Carrier (57) ABSTRACT

In a vehicle door structure, a beam member (21) having a S-shaped cross section and extending in a fore-and-aft direction of a vehicle body is attached to an inner panel (15), and the upper edge of the inner panel (15) is formed by the beam member (21). Thereby, a crash load of a frontal crash is transmitted in a favorable manner, and energy of a side impact is adequately absorbed without incurring a cost increase or a weight increase owing to the use of the door beam.

7 Claims, 12 Drawing Sheets

U.S. PATENT DOCUMENTS

| | | | |
|---|---|---|---|
| 5,429,410 A * | 7/1995 | Fleischer | 296/146.6 |
| 5,536,060 A * | 7/1996 | Rashid et al. | 296/146.6 |
| 5,542,738 A * | 8/1996 | Walker et al. | 296/187.05 |
| 5,555,677 A * | 9/1996 | DeRees et al. | 49/502 |
| 5,573,297 A * | 11/1996 | DeRees et al. | 296/146.6 |
| 5,756,167 A * | 5/1998 | Tamura et al. | 428/31 |
| 5,762,394 A * | 6/1998 | Salmonowicz et al. | 296/146.5 |
| 5,785,376 A * | 7/1998 | Nees et al. | 296/146.6 |
| 5,924,760 A * | 7/1999 | Krajewski et al. | 296/146.6 |
| 6,029,403 A * | 2/2000 | Bertolini et al. | 49/502 |
| 6,290,282 B1 * | 9/2001 | Hortlund et al. | 296/146.6 |
| 6,364,398 B1 * | 4/2002 | Kim | 296/146.6 |
| 6,390,534 B1 * | 5/2002 | Lee et al. | 296/146.6 |
| 6,554,345 B2 * | 4/2003 | Jonsson | 296/146.6 |
| 6,869,130 B2 | 3/2005 | Bodin et al. | |
| 7,040,688 B2 * | 5/2006 | White et al. | 296/146.6 |
| 7,059,657 B2 * | 6/2006 | Bodin et al. | 296/146.6 |
| 7,086,686 B2 * | 8/2006 | Bullmann et al. | 296/146.6 |
| 7,124,541 B2 * | 10/2006 | Fellner | 49/502 |
| 7,125,067 B2 * | 10/2006 | Bonnett et al. | 296/146.6 |
| 7,566,091 B2 * | 7/2009 | Yagi | 296/146.6 |
| 7,637,555 B2 * | 12/2009 | Kameoka | 296/146.6 |
| 8,033,592 B2 * | 10/2011 | Hsu et al. | 296/146.6 |
| 8,226,154 B2 * | 7/2012 | Nakano et al. | 296/187.12 |
| 2002/0000077 A1 * | 1/2002 | Goto et al. | 52/730.4 |
| 2003/0188492 A1 * | 10/2003 | Bonnett et al. | 49/502 |
| 2004/0060240 A1 * | 4/2004 | Fellner | 49/349 |
| 2004/0150249 A1 * | 8/2004 | Gehringhoff et al. | 296/146.6 |
| 2004/0174041 A1 * | 9/2004 | Graber et al. | 296/146.6 |
| 2004/0216386 A1 * | 11/2004 | Chernoff et al. | 49/502 |
| 2004/0244298 A1 * | 12/2004 | Ogawa et al. | 49/502 |
| 2005/0067856 A1 * | 3/2005 | Leistra et al. | 296/146.6 |
| 2005/0093333 A1 * | 5/2005 | Patberg | 296/146.5 |
| 2005/0150166 A1 * | 7/2005 | Seksaria et al. | 49/352 |
| 2006/0137249 A1 | 6/2006 | Nakamori | |
| 2007/0039245 A1 * | 2/2007 | Buchta et al. | 49/502 |
| 2007/0101658 A1 * | 5/2007 | Heyer | 49/502 |
| 2007/0119101 A1 * | 5/2007 | Mattsson | 49/502 |
| 2007/0119102 A1 * | 5/2007 | Seibert | 49/502 |
| 2008/0007087 A1 | 1/2008 | Endo | |
| 2008/0295415 A1 * | 12/2008 | Mieglitz et al. | 49/502 |
| 2009/0236871 A1 * | 9/2009 | Shibasaki | 296/146.6 |
| 2010/0052360 A1 * | 3/2010 | Hsu et al. | 296/146.6 |

FOREIGN PATENT DOCUMENTS

| | | |
|---|---|---|
| JP | 2000-355219 A | 12/2000 |
| JP | 2004-520224 T | 7/2004 |
| JP | 2005-126018 A | 5/2005 |
| JP | 2006-021744 A | 1/2006 |
| JP | 2006-321266 A | 11/2006 |
| JP | 2007-216788 A | 8/2007 |
| JP | 2007-296953 A | 11/2007 |
| TW | 1277546 B | 4/2007 |

* cited by examiner

VEHICLE DOOR STRUCTURE AND METHOD FOR FABRICATING THE SAME

TECHNICAL FIELD

The present invention relates to a vehicle door structure and a method for fabricating the same, and in particular to a vehicle door structure which is made resistant to front, rear and side crashes and a method for fabricating the same.

BACKGROUND OF THE INVENTION

A vehicle door structure used as a side door of a motor vehicle is formed of an outboard outer panel and an inboard inner panel. For reinforcement, a door structure is typically fitted with a reinforcement beam called as door beam having a front and rear end connected to the front and rear part of the inner panel, respectively. There are various forms of door beams, and they include those using a steel channel member that forms a box-shaped cross section in cooperation with the inner panel, those using a double-hat shaped cross section and those using a pipe member. See Japanese patent No. 3989373, and Japanese patent laid open publications No. 2005-126018 and No. 2006-021744.

A door beam having such a cross section reduces the deformation of the door opening of the vehicle body at the time of a frontal crash by transmitting the crash load (fore-and-aft axial load) from the front pillar (A-pillar) to the center pillar (B-pillar), and protects the inner space of the cabin by absorbing the impact load at the time of a side crash by causing a plastic deformation by means of the collapsing of the cross section.

The conventional door beam typically consisted of a member separate from the inner panel, and there is an overlap between the inner panel and door beam in the area where the door beam is attached to the inner panel. Therefore, when the size of the door beam is significant, the material cost and weight of the door beam may undesirably increase.

When the door beam is made of a channel member or provided with a double hat-shaped cross section, the door beam contributes to the protection of the cabin interior at the time of a side crash by collapsing the cross section into a more flat shape and thereby absorbing the crash load. However, because the centroid given as a point where a geometrical moment of area becomes zero does not coincide with the direction of the force acting upon the door beam, the impact load of a frontal crash applies a bending moment to the door beam, and such a bending of the door beam prevents a favorable transmission of the crash load (load path) to a rear part of the vehicle body.

When the door beam is made of a pipe member, the centroid of the cross section thereof may be made to coincide with the direction of the crash load acting thereon as a result of a frontal crash by suitably supporting the two axial ends thereof so that the crash load of a frontal crash may not produce a bending moment. However, such a door beam does not so readily deform as a channel member when subjected to a lateral force, and is therefore unable to absorb the energy of a side impact of a side crash in a favorable manner.

Also, in either case, if the door beam is simply attached to the inner panel, the fore-and-aft axial load that acts upon the door at the time of a frontal crash is offset from the centroid of the cross section, and the efficiency of transmitting the fore-and-aft axial force is thereby impaired. The conventional door beams including those using a steel channel member tends to be incompletely collapsed, and the energy of a side crash cannot be absorbed so much as desired.

BRIEF SUMMARY OF THE INVENTION

In view of such problems of the prior art, a primary object of the present invention is thus to minimize the cost and weight of a door beam for a vehicle door structure, achieve a favorable transmission of a crash load at the time of a frontal crash, and adequately absorb energy at the time of a side crash.

A second object of the present invention is to provide a vehicle door structure which is effective in dealing with a frontal, side or rear crash in a both effective and economical manner.

According to the present invention, such objects can be achieve at least partly by providing a vehicle door structure comprising an outer panel disposed on an outboard side and an inner panel disposed on an inboard side, wherein: the inner panel is provided with a major plane extending both vertically and in a fore-and-aft direction, and a beam member extending in a fore-and-aft direction is attached to the inner panel, the beam member having a cross section whose centroid substantially coincides with the major plane. The cross section of the beam member preferably comprises a S-shaped cross section part.

Thus, when a fore-and-aft force acts upon the door, the force is transmitted along the major plane of the inner panel so that the beam member is enabled to transmit the fore-and-aft force without involving any bending moment, and is thereby prevented from buckling. Therefore, the impact of a crash, be it a frontal crash or a rear end crash, can be effectively transmitted to the adjacent part of the vehicle body. The term "major plane" as used herein shall mean not only a geometrical "major plane" of the inner panel but also, whenever appropriate, a hypothetical plane along which a fore-and-aft force is transmitted between a front part and rear part of the vehicle.

In particular, if the cross section is provided with a S-shaped cross section, the beam member, not having a closed cross section, is enabled to favorably absorb an impact load of a side crash. More specifically, because the beam member is provided with a S-shaped cross section instead of forming a double walled structure or a box-shaped structure jointly with the inner panel, the beam member is enabled to completely collapse without leaving any un-collapsed part by a crash load of a side crash, and this ensures a favorable absorption of energy at the time of a side crash. Also, the beam member and inner panel do not redundantly overlap each other, and this allows the cost and weight to be reduced.

According to a preferred embodiment of the present invention, the S-shaped cross section of the beam member is formed by a pair of channel members each having a rectangular C-shaped cross section, the two channel members being connected one above the other in a mutually laterally reversed configuration. Typically, the beam member is formed as an upper extension of the inner panel.

When the vehicle door structure further comprises an inner cover panel extending vertically between a lower edge and an upper edge of the S-shaped cross section on an inboard side of the S-shaped cross section, the beam member forms a closed cross section jointly with the inner cover panel so that the mechanical properties of the assembly including the beam member and inner cover panel with respect to a fore-and-aft force and a lateral force can be designed as desired by suitably selecting the shapes, materials and thicknesses of the beam member and inner cover panel.

If the vehicle door structure comprises an inner cover panel extending vertically as an upper extension of the inner panel between a lower edge and an upper edge of the S-shaped cross section on an inboard side of the S-shaped cross section, the number of component parts can be reduced, and this contributes to the reduction in the manufacturing and material costs.

According to another embodiment of the present invention, the S-shaped cross section part is formed with an access opening confined within a vertically extending part of the cross section. Such an access opening can be conveniently used, for example, for providing an access that is required for mounting a door mirror to the outer panel.

If such an opening overlaps with a ridge line of the beam member, the capability of the beam member to transmit and support a fore-and-aft load may be diminished. Therefore, it is desirable that at least the vertically extending part of the beam member in which the opening is formed is vertically more elongated than another, substantially coplanar part of the beam member adjacent thereto along the fore-and-aft direction, so that the access opening may be confined within the vertically extending part of the beam member or, in other words, the vertically extending part of the beam member is vertically wide (tall) enough to accommodate an access opening of a required size. Preferably, the access opening is does not cross any of the ridge lines, so that the access opening does not compromise the functioning of the beam member as a load path member.

Typically, the vehicle door structure further comprises an inner cover panel extending vertically between a lower edge and an upper edge of the S-shaped cross section on an inboard side of the S-shaped cross section at least in a part opposing the access opening.

To simplify the assembly work, the vehicle door structure may be fabricated in such a manner that a strip of flat sheet forming a part of the beam member is welded to the inner panel, and is thereafter stamp formed into the S-shaped cross section. Also, the beam member may be used as a positional reference for mounting a door sash on the inner panel.

BRIEF DESCRIPTION OF THE DRAWINGS

Now the present invention is described in the following with reference to the appended drawings, in which.

DETAILED DESCRIPTION OF THE PREFERRED EMBODIMENTS

A first embodiment of the vehicle door structure of the present invention is described in the following with reference to FIGS. 1 to 6.

Figure 1:
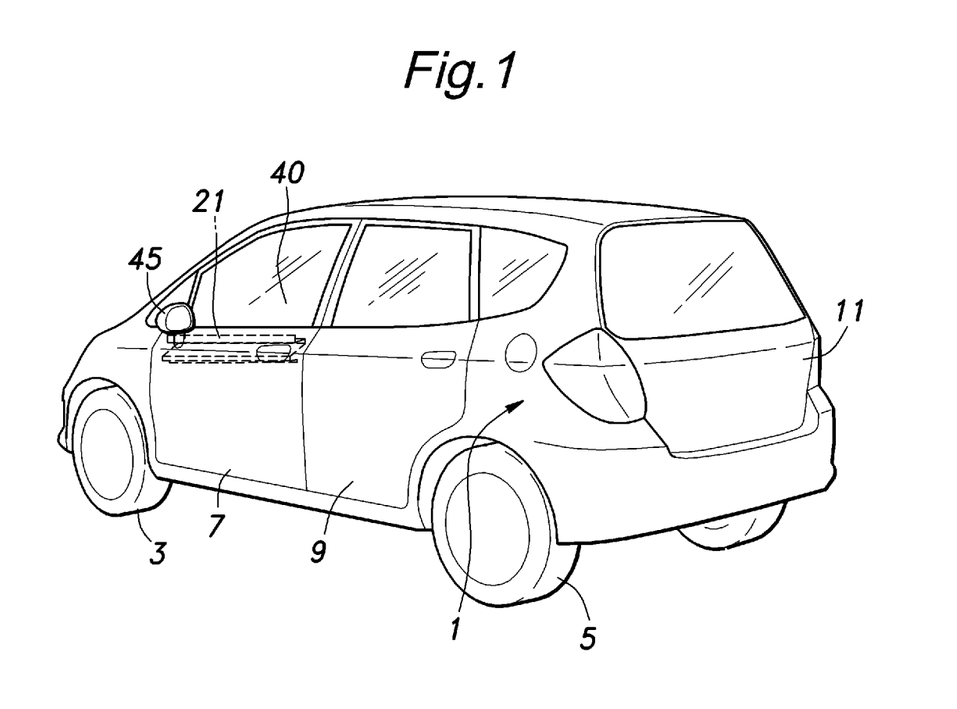
FIG. 1 is a perspective view showing an embodiment of a motor vehicle using a vehicle door structure according to the present invention.
Figure 2:
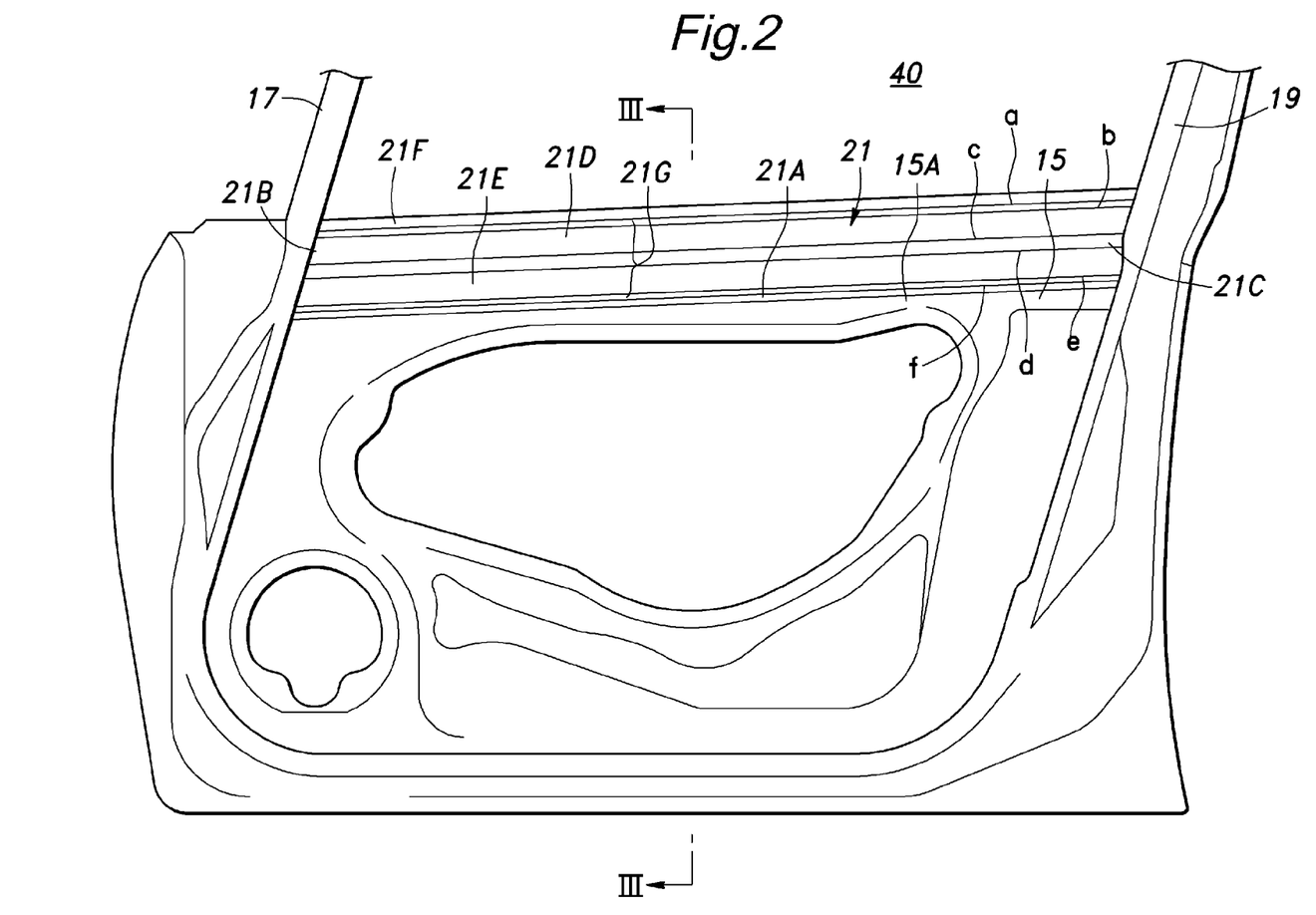
FIG. 2 is a front view of an inner panel in the embodiment of the vehicle door structure according to the present invention as seen from outboard side with an outer panel removed.

FIG. 1 shows a vehicle to which the vehicle door structure of the present invention is applied. In FIG. 1, numeral 1 denotes a vehicle body as a whole, numeral 3 front wheels, numeral 5 rear wheels, numeral 9 rear side doors, and 11 a tailgate.

The vehicle body structure of the present invention may be applied to any or all of the front side doors 7 and rear side doors 9. In the illustrated embodiment, the vehicle body structure of the present invention is applied to the left front door.

As shown in FIGS. 2 to 6, the front side door 7 comprises an outboard outer panel 13 and inboard inner panel 15. The space between the outer panel 13 and inner panel 15 receives a side window glass panel 31 in a vertically slidable manner.

The inner panel 15 is attached to an A-pillar 35 via a door hinge 33. The A-pillar 35 is connected to a front upper member 37 that extends forward from the A-pillar 35.

A beam member 21 extending in the fore-and-aft direction of vehicle body is attached to the inner panel 15, and the upper edge of the inner panel 15 is formed by the beam member 21.

The beam member 21 comprises a lower flat plate part 21A extending in the fore-and-aft direction and defining a vertical major plane, an upper flat plate part 21F extending in the fore-and-aft direction and defining a vertical major plane and a S-shaped cross section part 21G extending in the fore-and-aft direction between the lower flat plate part 21A and upper flat plate part 21F.

In the beam member 21, the lower flat plate part 21A is MIG welded to the upper edge (upper flange) 15A of the inner panel 15, a front edge 21B is MIG welded to a front door sash 17 of the inner panel 15 and a rear edge 21C is MIG welded to a rear door sash 19 of the inner panel 15. Thereby, the beam member 21 is firmly connected to the inner panel 15 along three sides thereof.

The inner panel 15 is given with a smaller vertical dimension, as compared to a normal inner panel, by the vertical dimension of the beam member 21, and the beam member 21 is connected to the upper edge of the inner panel 15 so as to fill the shortfall of the vertical dimension of the inner panel 15. Thereby, the upper edge of the inner panel 15 is solely formed by the beam member 21, and the lower edge of a window opening 40 of the front side door 7 is defined solely by the upper flat plate part 21F of the beam member 21.

Figure 3:
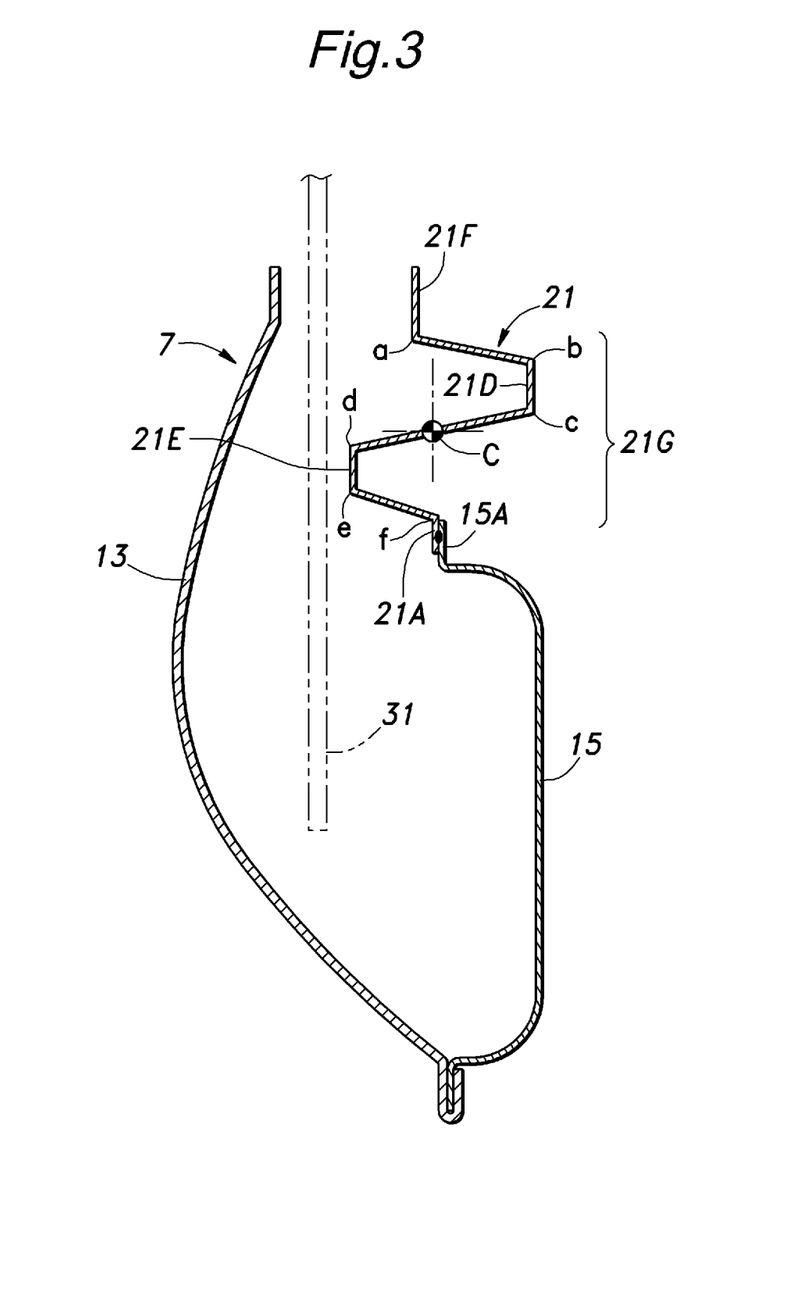
FIG. 3 is a sectional view taken along line III-III in FIG. 2.

The S-shaped cross section part 21G of the beam member 21 is formed by connecting a pair of rectangular C-shaped channel members 21D and 21E one above the other in a mutually laterally inverted relationship. A centroid C located on an axial line about which the geometrical moment of area is zero is located on a major plane of the inner door panel 15. Typically, a fore-and-aft load acting upon the inner panel 15 is transmitted along the major plane thereof or the vertical wall part thereof.

The S-shaped cross section part 21G of the beam member 21 thus provides six ridge (bent) lines a to f that extend between the front door sash 17 and rear door sash 19 so that the beam member 21 effectively functions as a fore-and-aft load path member.

Because the beam member 21 is attached to the upper edge 15A of the inner panel 15 as an upper extension thereof, the upper edge of the inner panel 15 is formed solely by the beam member 21, and this eliminates any double walled section that is formed jointly by the inner panel 15 and beam member 21 except for the small welding overlap between the upper edge 15A of the inner panel and lower flat plate part 21A beam member 21. Thereby, the material cost can be reduced, and the weight increase can be minimized.

Figure 5:
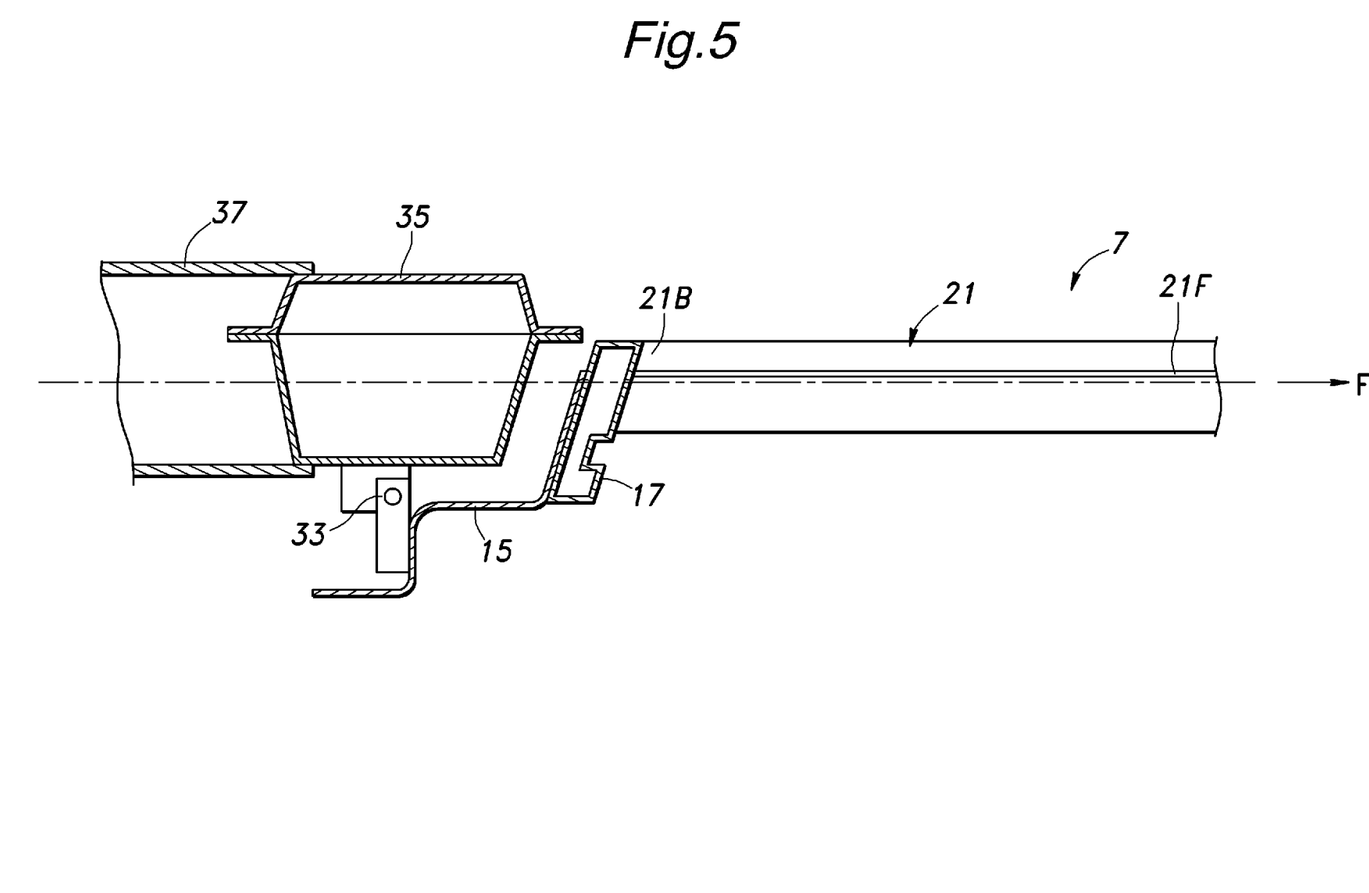
FIG. 5 is a fragmentary sectional plan view of the vehicle door structure according to the present invention.
Figure 6:
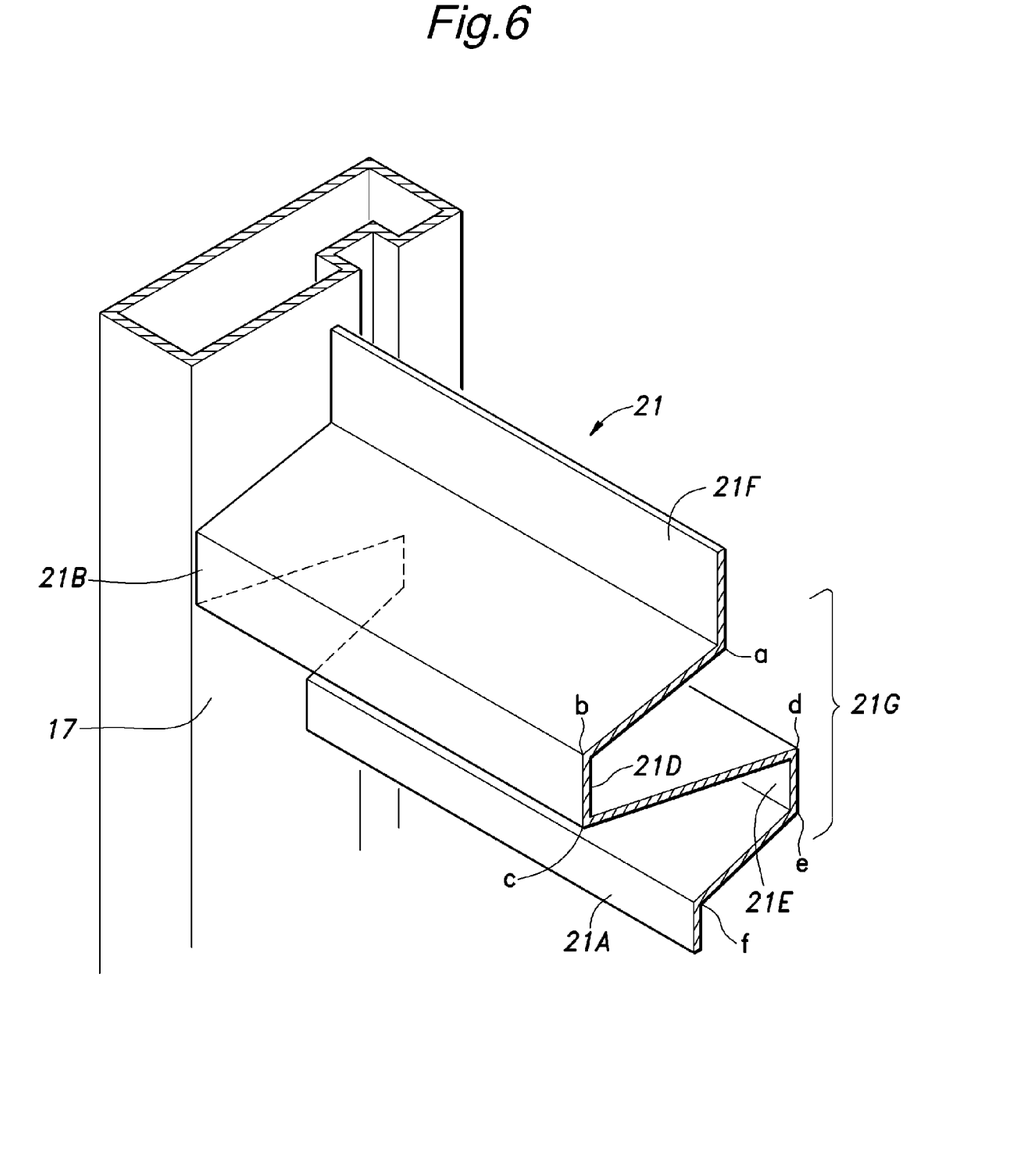
FIG. 6 is a fragmentary perspective view of the vehicle door structure according to the present invention.

Because the upper edge of the inner panel 15 is formed by the beam member 21 itself, the offset of the position at which the fore-and-aft load acts upon the front side door 7 at the time of a frontal crash from the centroid C of the door beam 21, as indicated by an arrow line F in FIG. 5, can be minimized or the position at which the fore-and-aft load acts upon the front side door 7 can be made to coincide with the cross sectional center (centroid) C of the door beam 21. Thereby, the efficiency of transmitting the fore-and-aft load from the A-pillar 35 to the B-pillar (not shown in the drawing) can be improved.

Figure 4:
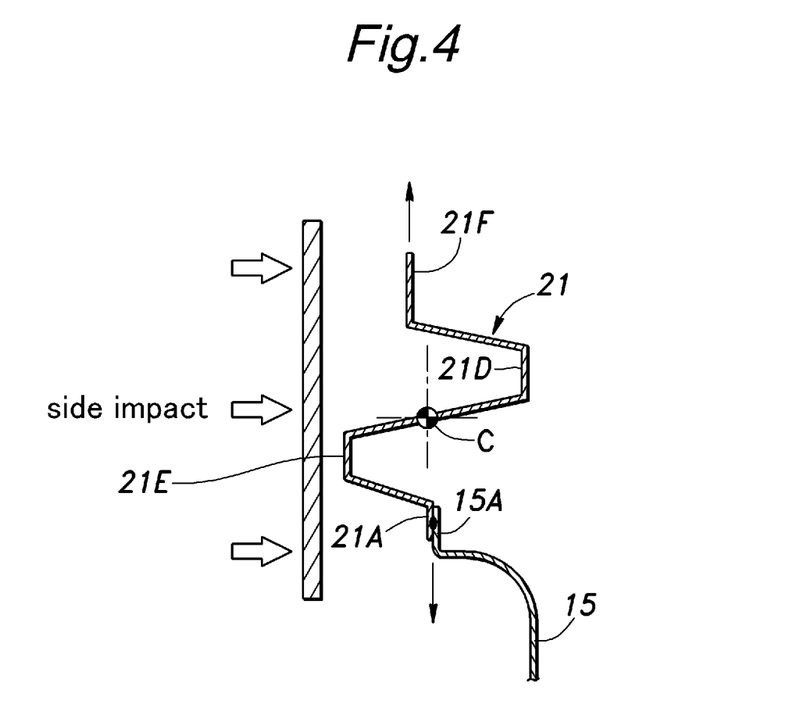
FIG. 4 is a diagram showing how a side crash affects the vehicle door structure according to the present invention.

The beam member 21 is given with a S-shaped cross section instead of forming a double walled structure or a box structure jointly with the inner panel 21 so that the beam member 21 is enabled to be fully collapsed by an impact load at the time of a side crash by extending vertically without leaving any uncollapsed part as illustrated in FIG. 4. The beam member 21 could be collapsed up to the thickness of the material of the beam member 21. Thereby, the energy of a side crash can be favorably absorbed, and the internal space of the cabin can be protected from collapsing when subjected to a side impact.

Because the beam member 21 is provided with a S-shaped cross section in which the centroid C and the line of action of the fore-and-aft load at the time of a frontal crash coincide with each other, the crash load of a frontal crash does not cause a bending moment in the beam member 21, and the crash load can be transmitted to a rear part of the vehicle body as a simple axial force. This contributes to the improvement of the transmission of the fore-and-aft axial load at the time of a frontal crash.

The assembly including the inner panel 15 and beam member 21 discussed above can be fabricated by welding a lower edge 21A of a flat strip of sheet material (for the beam member 21) to the upper edge (upper flange) 15A of the inner panel 15, and then stamp forming the sheet material into a S-shaped cross section. Thereafter, the front edge 21B and rear edge 21C of the beam member 21 are welded to the front door sash 17 and rear door sash 19, respectively.

According to this fabrication method, the mounting work and positioning work can be simplified so that the production efficiency can be improved. In this conjunction, it should be noted that the beam member 21 may be conveniently used as a positional reference when mounting the front and rear door sashes 17 and 19 to the inner panel 15.

Figure 7:
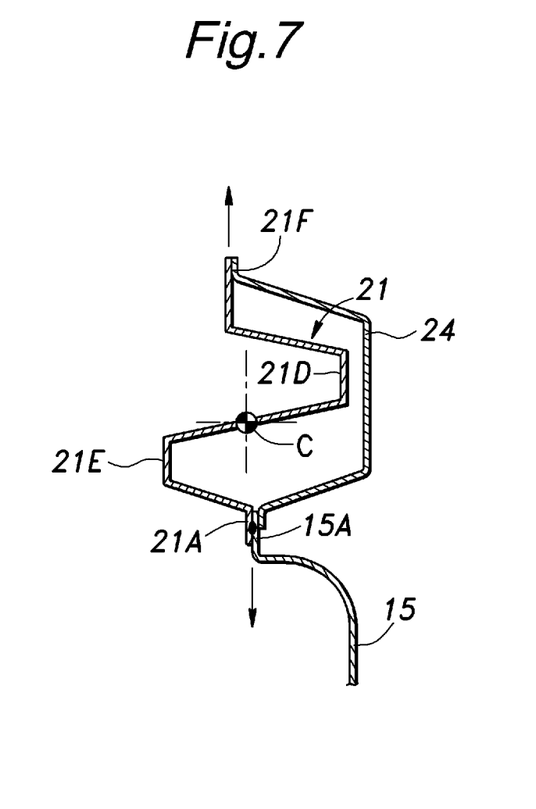
FIG. 7 is a view similar to FIG. 4 showing a second embodiment of the present invention.

FIG. 7 shows a second embodiment of the present invention. In FIG. 7, the parts corresponding to those of the previous embodiment are denoted with like numerals without repeating the description of such parts. In this embodiment, an inner cover panel 24 having a hat-shaped cross section is attached to an inner surface of the beam member 21. More specifically, the inner cover panel 24 is provided with an upper flange that overlaps with the upper flat plate part 21F of the beam member 21 and a lower flange that overlaps with both the upper flange 15A of the inner panel 15 and lower flat plate part 21A of the beam member 21. The inner cover panel 24 may be made of steel sheet similar to the material of the remaining part of the door. In such a case, the overlapping parts are typically MIG welded, spot welded or otherwise bonded to each other. If desired, the inner cover panel 24 may also be made of other materials that provide a required mechanical strength and rigidity.

Thus, the beam member 21 and inner cover panel 24 jointly form a closed cross section which reinforces the assembly comprising the beam member and inner cover panel 24 against a fore-and-aft load, and conditions the energy absorbing capability of the assembly with respect to a side load caused by a side impact. The fore-and-aft length of the inner cover panel 24 may either extend over the entire length of the beam member 21 or only a part of the length thereof.

Figure 8:
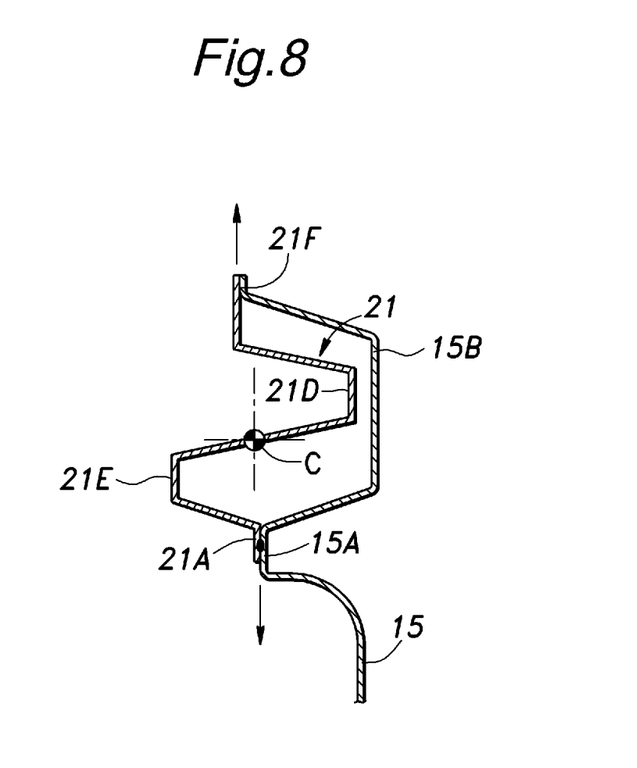
FIG. 8 is a view similar to FIG. 4 showing a third embodiment of the present invention.

FIG. 8 shows a third embodiment of the present invention which is slightly modified from the second embodiment, and, again, the parts shown in FIG. 8 corresponding to those of the previous embodiments are denoted with like numerals without repeating the description of such parts. In this embodiment, the inner cover panel 15B is formed as an upper extension of the inner panel 15, and this vehicle door structure is otherwise similar to the second embodiment. In this embodiment, the number of component parts is reduced so that the material cost and manufacturing cost can be both reduced.

Figure 9:
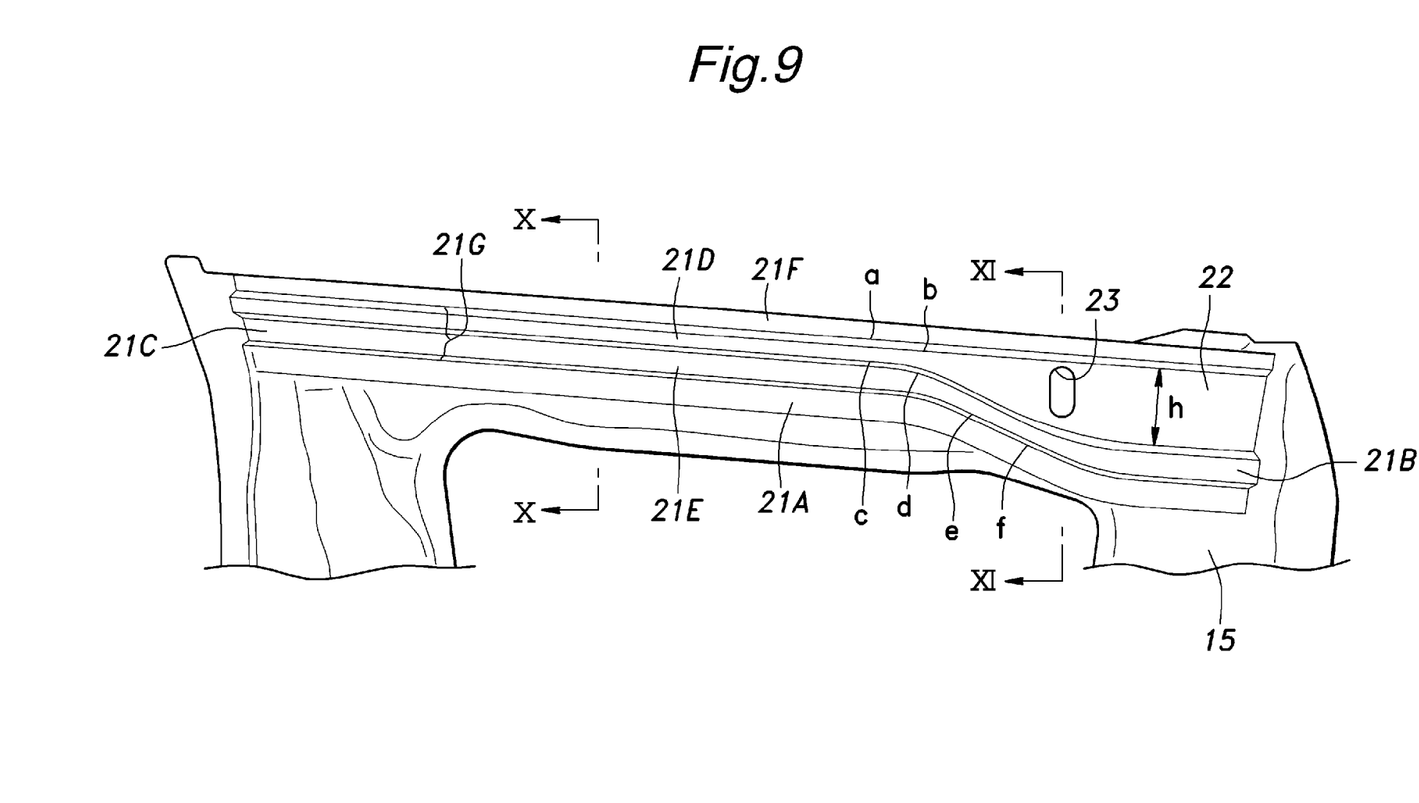
FIG. 9 is a fragmentary perspective view showing a fourth embodiment of the vehicle door structure according to the present invention.
Figure 10:
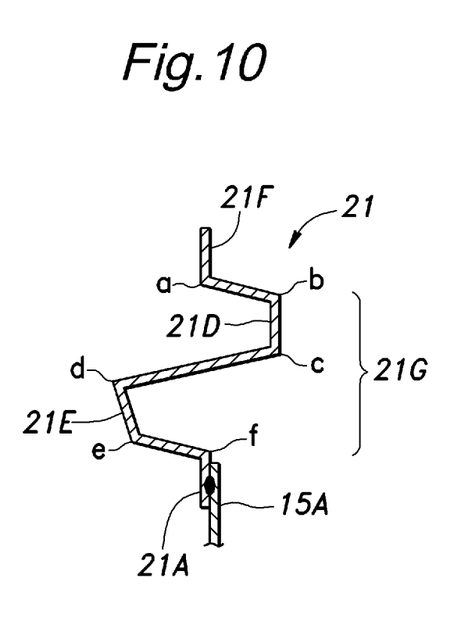
FIG. 10 is a sectional view taken along line X-X of FIG. 9.
Figure 11:
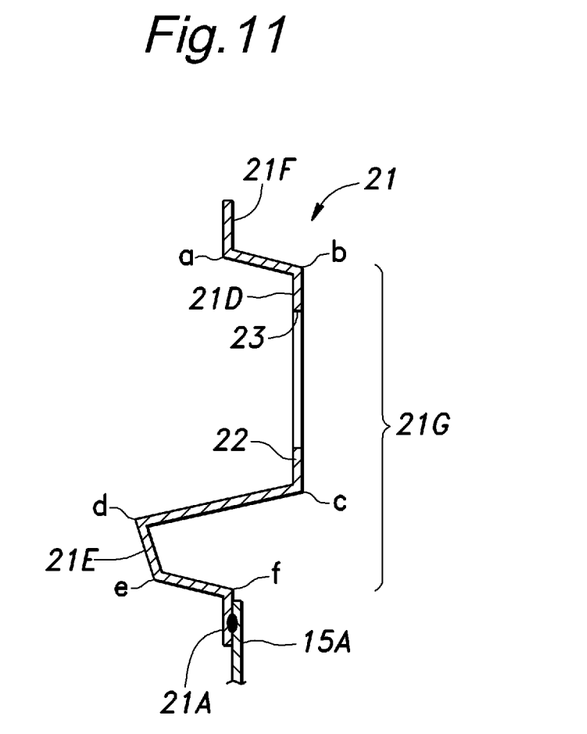
FIG. 11 is a sectional view taken along line XI-XI of FIG. 9.

FIGS. 9 to 11 show a fourth embodiment of the vehicle door structure according to the present invention. In FIGS. 9 to 11, the parts corresponding to those of the previous embodiments are denoted with like numerals without repeating the description of such parts.

The S-shaped cross section part 21G of the beam member 21, in particular the bottom wall of the channel member 21D is given with a locally (with respect to the fore-and-aft direction) enlarged vertical dimension or width h such as a vertically elongated part 22 formed in a front part of the beam member 21 of the illustrated embodiment. The vertically elongated part 22 is formed with an access opening 23 for assembly work.

The access opening 23 provides an access to the outer panel 13 of the front side door 7 from an inboard side when attaching a side mirror or door mirror 45 (see FIG. 1) to the outer panel 13 in a skin mount arrangement. The access opening 22 is formed in the vertically elongated part 22 without crossing any of the ridge lines a to f so that the access opening 23 does not compromise the functioning of the beam member as a load path member.

Figure 12:
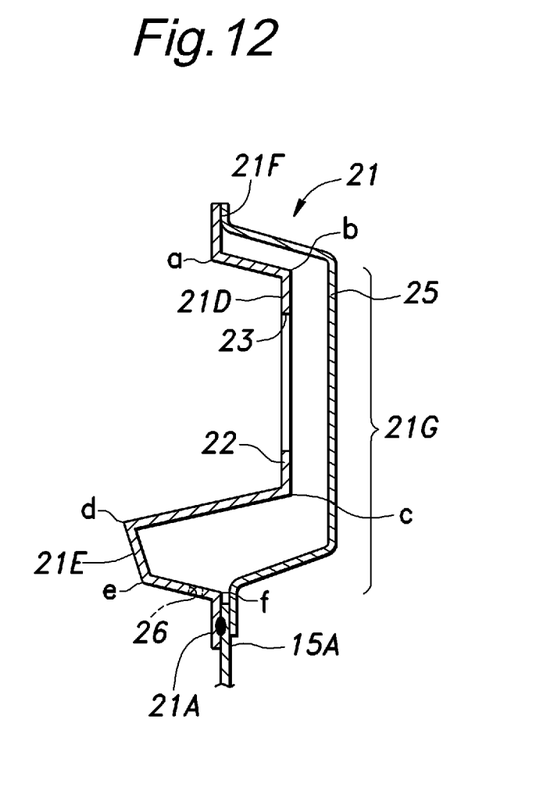
FIG. 12 is a view similar to FIG. 11 showing a fifth embodiment of the present invention.

FIG. 12 shows a fifth embodiment of the present invention which is slightly modified from the fourth embodiment. The parts in FIG. 12 corresponding to those of the previous embodiments are denoted with like numerals without repeating the description of such parts.

In this embodiment, an inner cover panel 25 having a hat-shaped cross section is attached to an inner surface of the beam member 21. More specifically, the inner cover panel 25 is provided with an upper flange that overlaps with the upper flat plate part 21F of the beam member 21 and a lower flange that overlaps with both the upper flange 15A of the inner panel 15 and lower flat plate part 21A of the beam member 21. The inner cover panel 25 may be made of plastic sheet, metallic sheet or other sheet material, and is preferably attached to the inner panel 15 or the beam member 21 so as to be detached if required for assembly work, servicing or other purposes. The inner cover panel 25 is effective in reducing noises that may be transmitted though the access opening 23 and shutting off moisture that may pass through the access opening 23. If necessary, a draining hole 26 may be provided in a lower part of the beam member 21 so that any moisture that may be trapped in the chamber defined between the beam member 21 and inner cover panel 25 may be put back into the interior of the door defined by the outer panel 13 and beam member 21 or inner panel 15.

Also, by attaching the inner cover panel 25 to the upper flat plate part 21F of the beam member 21 and upper flange 15A of the inner panel 15 with a proper sealing, even when the welding between the upper flange 15A of the inner panel 15 and lower flat plate part 21A of the beam member 21 fails to provide an adequately tight seal against intrusion of moisture, such moisture is prevented from entering the cabin by the inner cover panel 25.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as the contents of any prior art mentioned in the present application are incorporated in this application by reference.

1 vehicle body
3 front wheels
5 rear wheels
7 front side doors
9 rear side doors
11 tailgate
13 outer panel
15 inner panel
17 front door sash
19 rear door sash
21 beam member
21A lower flat plate
21B front edge
21C rear edge
21D, 21E channel members
21F upper flat plate
21G S-shaped cross section
35 A-pillar

The invention claimed is:

1. A vehicle door structure comprising an outer panel disposed on an outboard side and an inner panel disposed on an inboard side, wherein:
the inner panel is provided with a major plane extending both vertically and in a fore-and-aft direction, and a beam member extending in a fore-and-aft direction is attached to the inner panel, the beam member having a cross section whose centroid substantially coincides with the major plane; and
wherein the cross section of the beam member comprises an S-shaped cross section part formed by a pair of channel members each having a rectangular C-shaped cross section, the two channel members being connected one above the other in a mutually laterally reversed configuration such that a plurality of ridge lines extending in the fore-and-aft direction are defined, and an access opening is formed in a vertically extending planar part of the beam member which is vertically more elongated than another, substantially coplanar part of the beam member adjacent thereto along the fore-and-aft direction, wherein the access opening is confined within the vertically extending planar part of the beam member.

2. The vehicle door structure according to claim 1, wherein the beam member is formed as an upper extension of the inner panel.

3. The vehicle door structure according to claim 2, further comprising an inner cover panel extending vertically between a lower edge and an upper edge of the S-shaped cross section on an inboard side of the S-shaped cross section.

4. The vehicle door structure according to claim 1, further comprising an inner cover panel extending vertically as an upper extension of the inner panel between a lower edge and an upper edge of the S-shaped cross section on an inboard side of the S-shaped cross section.

5. The vehicle door structure according to claim 1, further comprising an inner cover panel extending vertically between a lower edge and an upper edge of the S-shaped cross section on an inboard side of the S-shaped cross section at least in a part opposing the access opening.

6. A vehicle door structure comprising an outer panel disposed on an outboard side and an inner panel disposed on an inboard side, wherein:
the inner panel is provided with a major plane extending both vertically and in a fore-and-aft direction, and a beam member extending in a fore-and-aft direction is attached to the inner panel, the beam member having a cross section whose centroid substantially coincides with the major plane; and
wherein the cross section of the beam member comprises an S-shaped cross section part formed by a pair of channel members each having a rectangular C-shaped cross section, the beam member configured such that a plurality of ridge lines extending in the fore-and-aft direction are defined thereon, and an access opening is formed in a vertically extending panel portion of the beam member which is vertically more elongated than another, substantially coplanar part of the beam member adjacent thereto along the fore-and-aft direction, the beam member configured and arranged so that the access opening is formed in the vertically elongated panel portion without crossing any of the ridge lines,
and wherein the beam member is operable to function as a fore-and-aft load path member in the event of a collision.

7. A method of fabricating the vehicle door structure according to claim 1, wherein a strip of flat sheet forming a part of the beam member is welded to the inner panel, and is thereafter stamp formed into the S-shaped cross section.

* * * * *